United States Patent [19]

Kondo et al.

[11] Patent Number: 5,068,726
[45] Date of Patent: Nov. 26, 1991

[54] CODING APPARATUS THAT TEMPORALLY INTERPOLATES BLOCK DATA AND SELECTS TRANSMISSION MODE

[75] Inventors: Tetsujiro Kondo; Kenji Takahashi, both of Kanagawa, Japan

[73] Assignee: Sony Corporation, Tokyo, Japan

[21] Appl. No.: 617,806

[22] Filed: Nov. 26, 1990

[30] Foreign Application Priority Data

Nov. 28, 1989 [JP] Japan ............................. 1-308225

[51] Int. Cl.[5] .......................................... H04N 7/12
[52] U.S. Cl. ................................... 358/135; 358/136
[58] Field of Search ................. 358/135, 136, 138, 133

[56] References Cited

U.S. PATENT DOCUMENTS 4,994,911 2/1991 Nakagawa et al. ................. 358/135

Primary Examiner—Victor R. Kostak
Attorney, Agent, or Firm—Lewis H. Eslinger; Jay H. Maioli

[57] ABSTRACT

A highly efficient coding apparatus comprises a, circuit (2) for block-segmenting picture element data in areas belonging to each of continuous n (n≧2) frames of digital picture signals, switching circuit (9) for switching in a block unit, a first mode where all picture element data in the n frames of each block is transmitted and a second mode where picture element data in m frames of the n frames is transmitted, a circuit (12, 13 and 14) for detecting, in the second mode, a difference between an interpolation value which interpolates non-transmission data of an objective block from at least picture element data of the objective block to be transmitted and a real value of the non-transmission data, a control signal generating circuit (17) for generating a control signal for the switching circuit (9) on the objective block based on an output of the detecting circuit (12, 13 and a 14), and circuit (10) for transmitting transmission data of an output of the switching circuit (17) and the control signal SJ.

4 Claims, 9 Drawing Sheets

Fig. 5
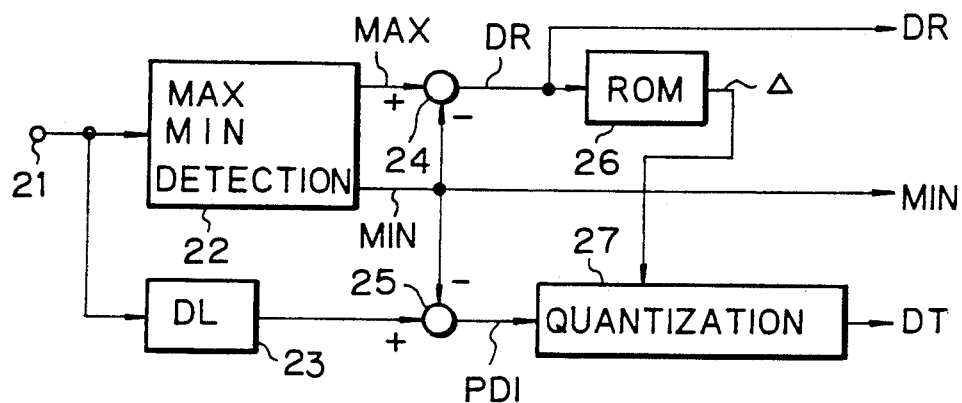
Fig. 6A
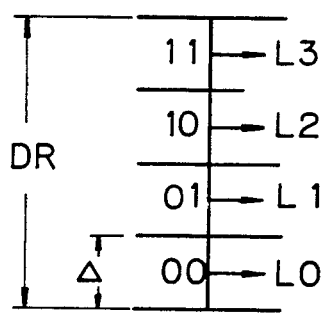
Fig. 6B
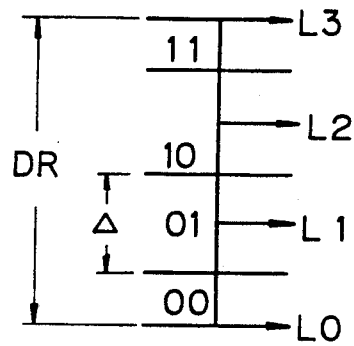
Fig. 7A P1 
Fig. 7B P2 
Fig. 7C P3 

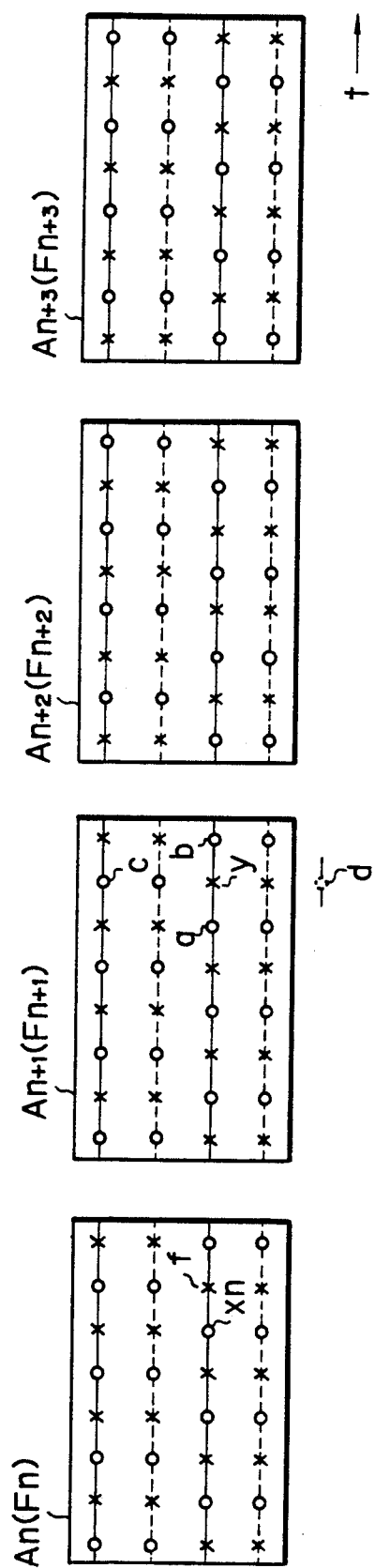

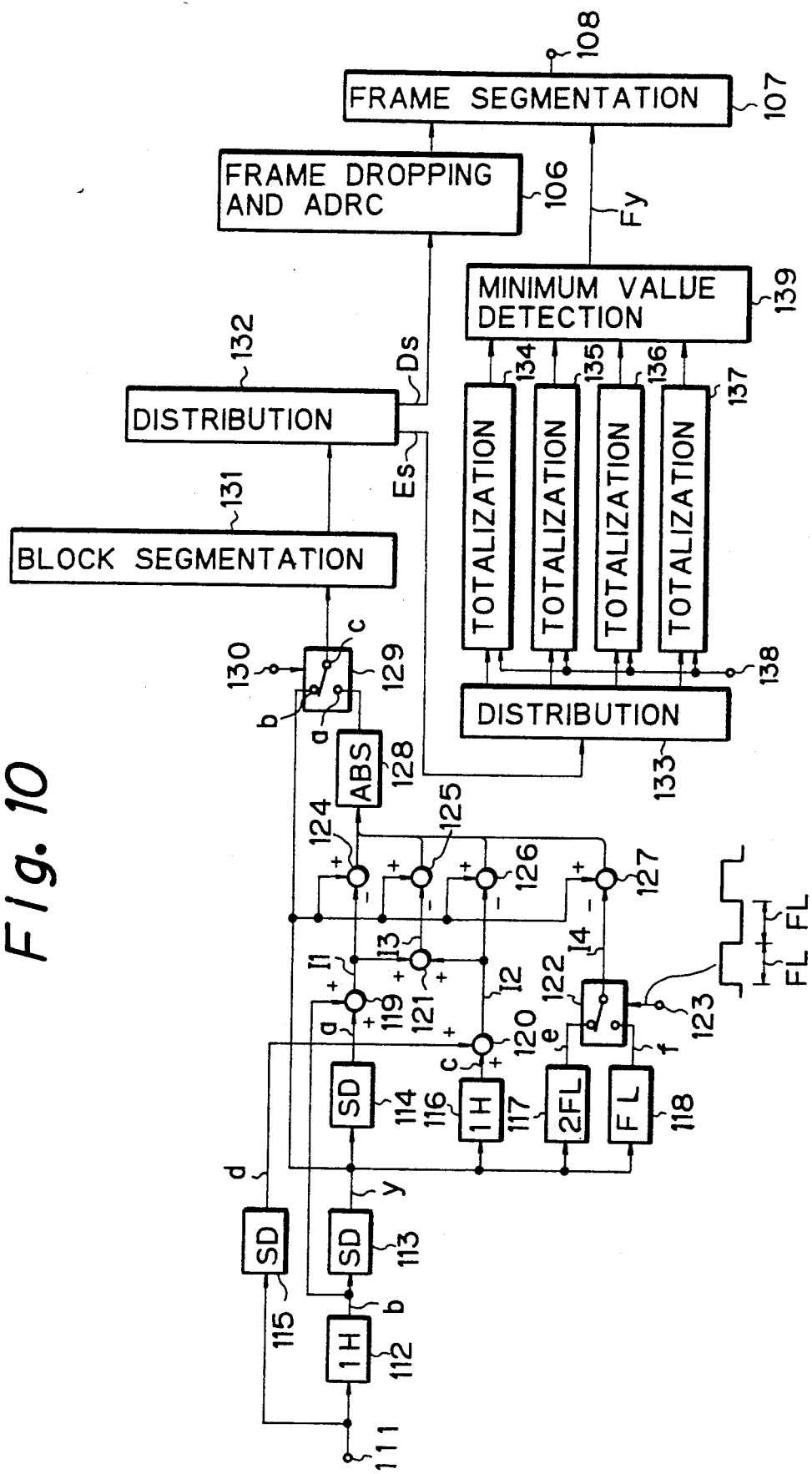

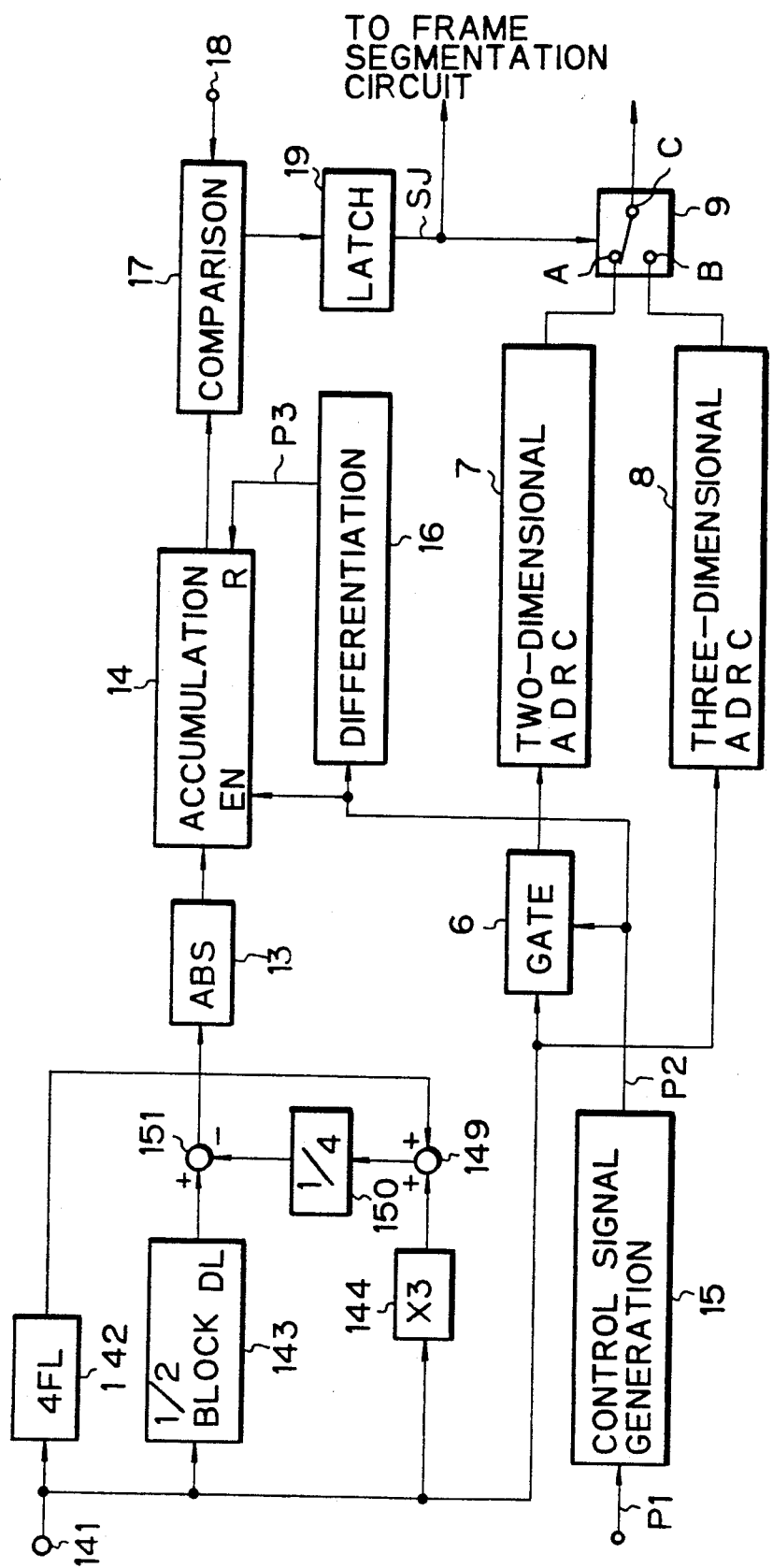

5,068,726

CODING APPARATUS THAT TEMPORALLY INTERPOLATES BLOCK DATA AND SELECTS TRANSMISSION MODE

BACKGROUND OF THE INVENTION

1. Field of the Invention

This invention relates to a highly efficient coding apparatus applied to the reduction of the transmission data amount of a digital picture signal such as a digital television signal.

2. Description of the Prior Art

The present applicant has proposed an adaptive coding apparatus for obtaining a dynamic range which is equal to a difference between the maximum value and the minimum value of plural picture elements contained in a two-dimensional block and performing encoding adaptive to the dynamic range, as described in Japanese Patent Unexamined Publication Sho 61-144989. Also, disclosed in JPUP Sho 62-92620, an adaptive coding apparatus has been proposed for carrying out encoding adaptive to a dynamic range with respect to a three-dimensional block formed by picture elements of areas which are contained in each of plural frames. Further, as described in JPUP Sho 62-128621, a variable length encoding method for varying the bit number depending on a dynamic range to make constant the maximum distortion occurring at the time of quantization has been proposed.

The above-stated encoding adaptive to the dynamic range (called "ADRC") enables the decrease of the bit number per picture element by compressing a redundancy in the level direction and can thereby compress the data amount to be sent to a great extent. Such ADRC is suited for a digital VTR. Moreover, for the purpose of compressing the transmission data amount with the elimination of the redundancy in the time direction, the present applicant has proposed a hybrid system in which adaptive frame dropping for transmitting an average value of picture elements in the three-dimensional block in the case of a block of a still picture and ADRC for detecting a movement of a picture in a block in the case of the ADRC of the three-dimensional block are combined (refer to Patent Application Sho 60-247840).

Adaptive frame dropping of the three-dimensional block will be described referring to FIG. 1. In FIG. 1, F1, F2, F3, . . . represent a continuous first frame, second frame, third frame, . . . The three-dimensional block is composed of, for example, two areas corresponding in space and respectively belonging to frames continuous in time which are obtained by the division of one frame picture into many two-dimensional areas. A level change of one picture element data at the same position in space of the three-dimensional block is shown in FIG. 1.

One block is constructed by two areas respectively belonging to the frames F1 and F2, and, similarly, one block is composed of two areas respectively belonging to frames F3 and F4, frames F5 and F6, . . . In these blocks, when the change of the luminance in the time direction of picture element data a0 and a0', a1 and a1', . . . is slow, it tends to be decided as a block of a still picture (called "still block"). In the still block, an average of picture element data corresponding to each other in space of the values such as $\frac{1}{2}(a0+a0')$, $\frac{1}{2}(a1+a1')$, . . . are formed as indicated by black dots. These average values are sent in place of original picture element data.

On the reception side, the average values are used repeatedly over the two-frame period for use as the reproduced picture element data. As a result, the number of transmission picture elements is reduced to $\frac{1}{2}$ when the frame dropping is perform.

In this way, when the level change of picture element data at the same position in space is slow, it tends to be decided as a still block. Moreover, when the decision is sensitive with respect to a still block and a block of a moving picture (called "a moving block"), there is a case where one of two adjacent blocks in space is decided as a still block and the other is decided as a moving block. For example, in FIG. 1, there is a case where the block containing a0 and a0' is decided as a still block and a block adjacent to this block is decided as a moving block. In this case, there is no problem for the area where a difference of luminance level is inherently found, as in the contour of a thing. However, for the area where almost the same luminance level is seen, block distortion takes place to provide a level difference between adjacent blocks which is the cause of an unacceptable picture.

OBJECTS AND SUMMARY OF THE INVENTION

It is, therefore, an object of the invention is to provide a highly efficient coding apparatus free from block distortion by executing the decision of the frame dropping based on an interpolation system similar to that on the reception side.

Another object of the invention is to provide a highly efficient coding apparatus which can improve a compression rate by using sub-sampling.

Still another object of the invention is to provide a highly efficient coding apparatus which can prevent a deterioration of a definition of a still portion even though the compression rate is made higher.

According to an aspect of the invention, there is provided a highly efficient coding apparatus which comprises:

means (2) for block-segmenting picture element data in areas belonging to each of continuous n (n≧2) frames of digital picture signals;

switching means (9) for switching in a block unit, a first mode where all picture element data in the n frames of each block is transmitted and a second mode where picture element data in m frames in the n frames is transmitted;

means (12, 13, and 14) for detecting, in the second mode, a difference between an interpolated value which interpolates non-transmission data of an objective block from at least picture element data of the objective block to be transmitted and a real value of the non-transmission data;

control signal generating means (17) for generating a control signal SJ for the switching means (9) on the objective block based on an output of the detecting means (12, 13, and 14); and transmitting means (10) for transmitting transmission data of an output of the switching means (17) and the control signal SJ.

In the above-mentioned arrangement, when data of non-transmission picture elements is linearly interpolated on the reception side, a difference between an interpolated value obtained by the linear interpolation and a real value is provided at a subtracter 12. If an accumulated value of the differences of one block is large, the frame dropping is not executed. On the other hand, when that value is small, the frame dropping is carried out. Consequently, in a reproduced picture, the generation of block distortion taking palce between a block subjected to the frame droppoing and a block not subjected to the frame dropping can be prevented.

The above, and other, objects, features and advantages of the present invention will become readily apparent from the following detailed description thereof which is to be read in connection with the accompanying drawings.

BRIEF DESCRIPTION OF THE DRAWINGS

FIG. 5 is a block diagram of detail constitution showing in an ADRC encoder;

FIG. 6 is a schematic diagram for explaining an operation of the ADRC;

FIG. 7 is a schematic diagram for explaining the operation of the embodiment shown in FIG. 2;

FIG. 9 is a schematic diagram for explaining an operation of a second embodiment of the invention;

FIG. 10 is a block diagram of the second embodiment of the invention;

FIG. 11 is a block diagram showing in detail an ADRC encoder of the second embodiment shown in FIG. 10.

DETAILED DESCRIPTION OF THE PREFERRED EMBODIMENTS

Figure 2:
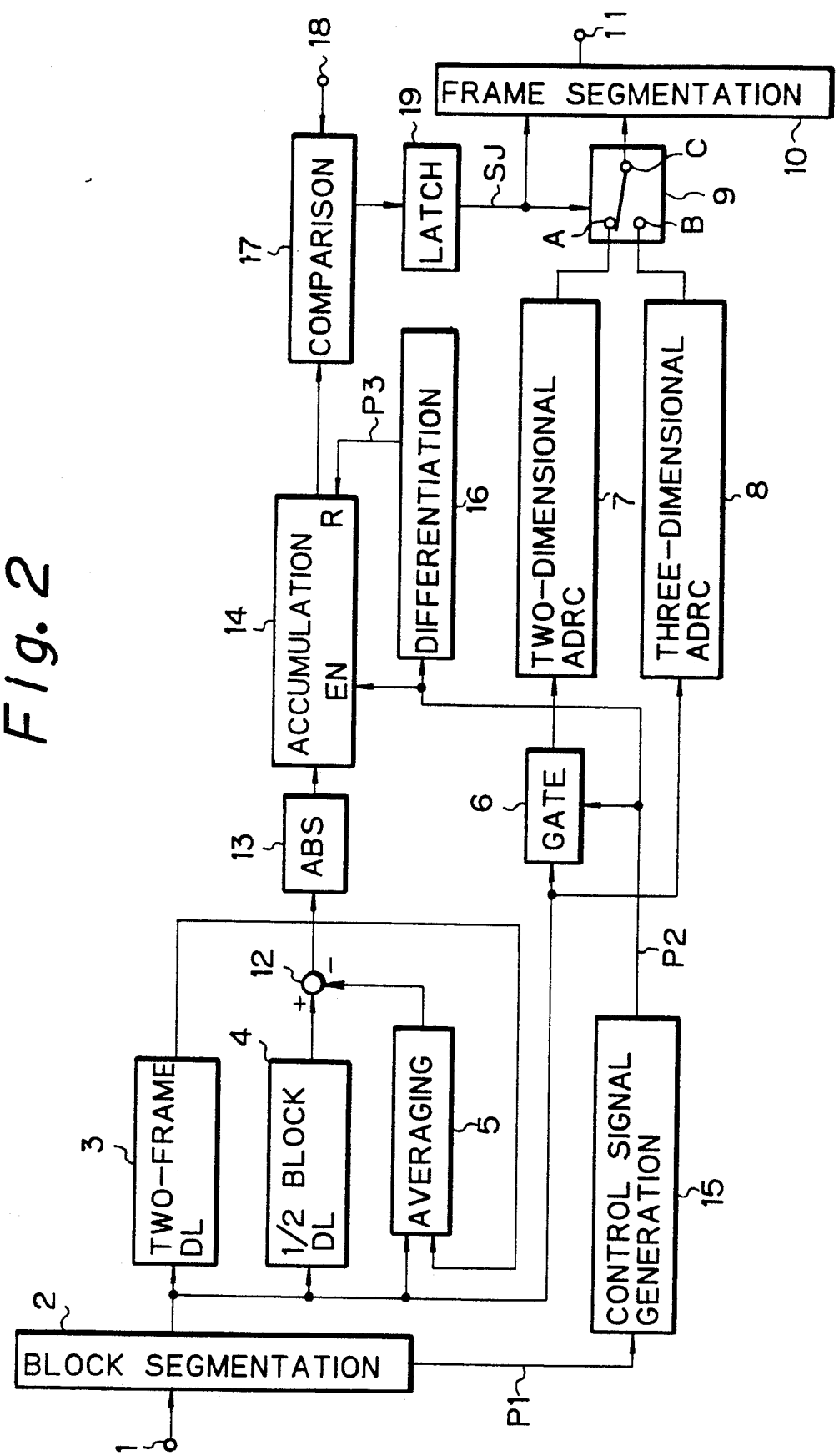
FIG. 2 is a block diagram of the first embodiment of the invention.
Figure 3:
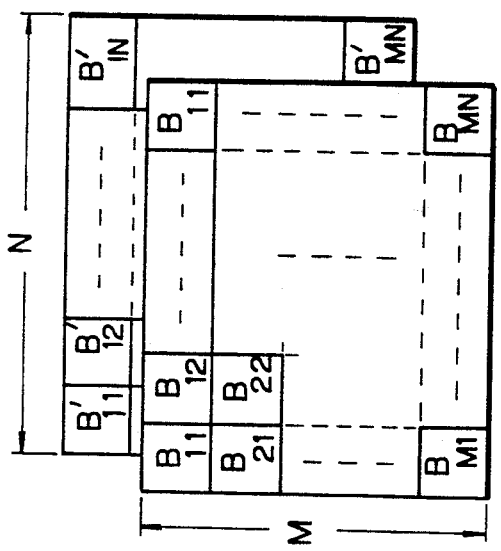
FIGS. 3 and 4 are schematic diagrams for explaining an operation of the embodiment shown in FIG. 2.

One embodiment of the invention will be described referring to the drawings. FIG. 2 shows a structure on the transmission side of one embodiment, and digital video data provided by digitizing one sample into 8 bits is supplied to an input terminal indicated at 1. For the video data, its data arrangement is converted from the scanning order into the block order at a block segmentation circuit 2. A picture of one frame is segmented into $(M \times N)$ as shown in FIG. 3, and areas B11, B12, ..., BMN are formed. The next frame in terms of time is similarly divided to form areas B11', B12', ..., BMN'. Further, the two areas B11 and B11', B12 and B12', ... BMN and BMN' lying in the same positions in terms of space respectively form three-dimensional blocks. One area is, for example, (4 lines×4 picture elements) to consequently make the number of picture elements of one block equal to 32.

Figure 4:
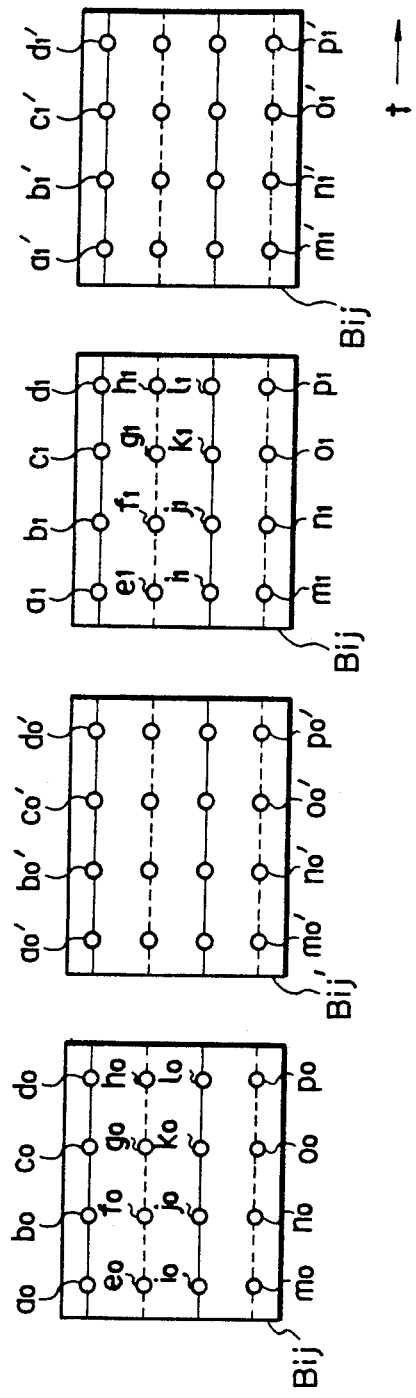

FIG. 4 shows changes in terms of time with respect to the blocks present in the same positions in terms of space, and areas Bij and Bij' constitute one block. Picture element data is generated from the block segmentation circuit 2 in the order of (a0, b0, c0, ... o0, p0, a0', b0', c0', ... .o0', p0'). The picture element data a1 is generated two frame after the picture element data a0.

The output signal of the block segmentation circuit 2 is supplied to a two-frame delay circuit 3, a ½ block (16 picture element data) delay circuit 4, an averaging circuit 5, a gate circuit 6 and a three-dimensional ADRC encoder 8. The output signal of the gate circuit 6 is supplied to a two-dimensional ADRC encoder 7. The encoded outputs of the ADRC encoders 7 and 8 are given to input terminals A and B of a switching circuit 9, respectively. One encoded output is selected at its output terminal C. The encoded outputs include additional codes (DR, MIN) and a code signal DT corresponding to each picture element.

The encoded output from the output terminal C of the switching circuit 9 is given to a frame segmentation circuit 10. A decision code SJ corresponding to the presence and absence of frame dropping is also fed to the frame segmentation circuit 10. The frame segmentation circuit 10 forms transmission data in which the dynamic range DR, the minimum value MIN and the code signal DT are arranged in a byte-serial fashion and a synchronization signal is added. Also, in the frame segmentation circuit 10, encoding for error correction codes is made. The transmission data taken out at an output terminal 11 of the frame segmentation circuit 10 is recorded onto a magnetic tape by a rotary head through, for example, an encoder for channel encoding, a recording amplifier, etc.

In this one embodiment, the code signal DT of the area Bij' subsequent in time of two areas which form one block is transmitted at the time of a second mode for frame dropping, whereas the code signal DT of the previous area Bij is not sent. The two-dimensional ADRC encoder 7 encodes 16 picture element data compressed to ½ through the frame dropping. The three-dimensional ADRC encoder 8 encodes 32 original picture element data at the time of a first mode where no frame dropping is done. On the reception side, data of non-transmission picture elements is interpolated by a linear interpolation (primary interpolation) with respect to the blocks subjected to the frame dropping. The decision on whether frame dropping is done is made based on a magnitude of the difference between a real value and an interpolated value obtained by the same interpolation as the interpolation system on the reception side.

The averaging circuit 5 develops an average of an input signal and an output signal of the two-frame delay circuit 3, that is, an interpolation value. The output signal of the averaging circuit 5 is decreased from the output signal of the ½ block delay circuit 4 in a subtracter 12. The output signal of the subtracter 12 is converted into an absolute value at an absolute value generator 13. The absolute value is a difference between a real value of one picture element to be an objective and an interpolation value, and an accumulated value of differences of one block is calculated at an accumulator 14. The accumulated value is supplied to a comparator 17 and compared with a reference value from a terminal 18. A maximum value detector may be used for detecting the maximum value in the differences of one block in place of the accumulator 14.

The comparator 17 compares the magnitude of the accumulated value and the magnitude of reference value. When the accumulated value is smaller than the reference value, a "1" output signal indicating that the frame dropping processing is possible is generated. On the contrary, when the accumulated value is larger than the reference value, a "0" output signal indicating that the frame dropping processing is impossible is generated. The output signal of the comparator 17 is held in a latch 19. The output of the latch 19 is supplied to the switching circuit 9 and the frame segmentation circuit 10 as the decision code SJ.

At the time of the second mode where the frame dropping processing is carried out, that is, in the presence of "1" of the decision code SJ, the input terminal A and the output terminal C of the switching circuit 9 are selected so that the encoded output of the ADRC encoder 7 is selected. On the other hand, in the first mode where no frame dropping processing is done, that is, in the presence of "0" of the decision code SJ, the input terminal B and the output terminal C of the switching circuit 9 are selected so as to select the encoded output of the ADRC encoder 8.

The gate circuit 6 passes picture element data of the area Bij' lying behind in terms of time in the two areas Bij and Bij' forming a block by a control signal P2 from a control signal generator 15. The control signal generator 15, which is supplied with a clock signal P1 of every block period from the block segmentation circuit 2, develops the control signal P2 in synchronism with the output signal of the block segmentation circuit 2. Also, the control signal P2 makes an enable signal of the accumulator 14 and can perform an accumulation operation in a period of "1". Further, the control signal P2 is given to a differential circuit 16, and a differential pulse P3 from the differential circuit 16 is supplied to the accumulator 14 as its reset signal.

An example of the three-dimensional ADRC encoder 8 is shown in FIG. 5. The output signal of the block segmentation circuit 2 is fed to an input terminal indicated at 21. The input signal is supplied to a maximum value and minimum value detector 22 and a delay circuit 23. The detector 22 detects the maximum value MAX and the minimum value MIN among 32 picture element data of one block. The delay circuit 23 delays the data for a period of time detecting the maximum value MAX and the minimum value MIN.

A subtraction of (MAX−MIN) is done at a subtracter 24, and a dynamic range DR is provided from the subtracter 24. The dynamic range DR is supplied to a ROM 26, for example, to provide a four-bit code signal, the dynamic range DR is brought to 1/16. A quantization step $\Delta$ is given from the ROM 26. In the subtracter 25, the minimum value MIN is subtracted from picture element data from the delay circuit 23, and picture element data PDI with the minimum value subtracted is provided from the subtracter 25.

The normalized data PDI due to the elimination of the minimum value from the subtracter 25 and the quantization step $\Delta$ is supplied to a quantization circuit 27. A four-bit code signal DT which is less than its original bit number (8 bits) is obtained from the quantization circuit 27. The quantization circuit 27 performs the quantization adaptive to the dynamic range DR. For simplicity of explanation, in an example of two-bit quantization, data PDI with the minimum value eliminated is divided by the quantization step $\Delta$ which divides the dynamic range DR into ($2^2=4$) as shown in FIG. 6A, and a value, which is obtained by making an integer through discarding the quotient, is handled as the code signal DT. The quantization circuit 27 may be composed of a division circuit or a ROM. In FIG. 6, L0, L1, L2 and L3 indicate decoded levels.

For a quantization method in the quantization circuit 27, as shown in FIG. 6B a method in which values equal to the maximum value MAX and the minimum value MIN are obtained as decoded levels may be employed.

The two-dimensional ADRC encoder 7 has the same construction as the above-stated three-dimensional ADRC encoder. Here, only 16 picture element data of the area Bij' lying on the rear side of one block is encoded by the gate circuit 6.

FIG. 7A shows the clock signal P1 supplied from the block segmentation circuit 2 to the control signal generator 15. The clock signal P1 is generated every block period. The control signal P2 whose level is inverted in a period of one half of one block period is developed at the control signal generator 15 as shown in FIG. 7B. In a period where the control signal P2 is "0", 16 picture element data of the area Bij lying on the front side of one block is contained. In a period where the control signal P2 is "1", 16 picture element data of the subsequent area Bij' is included. In the "1" period of the control signal P2, the gate circuit 6 is turned on, and picture element data of the subsequent area Bij' is supplied to the ADRC encoder 7 through the gate circuit 6. At the timing of the leading edge of the control signal P2, a differential pulse P3 indicated in FIG. 7C is generated from the differential circuit 16. The accumulator 14 is reset to prepare for an accumulation operation on the next block with the differentiated pulse P3.

Figure 8A:
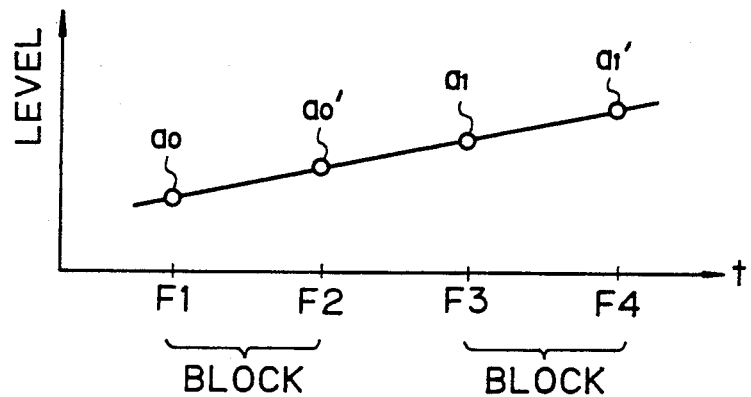
FIGS. 8A and 8B are schematic diagrams for explaining the operation of the embodiment shown in FIG. 2.

Description of the frame dropping process in one embodiment will be given referring to FIG. 8A. In FIG. 8A, F1, F2, F3, ... represent a continuous first frame, second frame, third frame, ... One example of a level change of one picture element data a0, a0', a1, A1', ... which lies in the same position in terms of space of the three-dimensional block (refer to FIG. 4) composed of the two areas Bij and Bij' is indicated in FIG. 8A.

An operation will be explained in the case where an objective block, which is a target for a frame dropping decision, is a block containing the picture element data a1, and a1'. In the timing the picture element data a1' appears from the block segmentation circuit 2, the picture element data a0' is generated from the two-frame delay circuit 3. In addition, in the timing, the picture element data a1 is provided on the output side of the ½ block delay circuit 4. As a result, an interpolation value ½(a0'+a1') is developed by the averaging circuit 5. The interpolation value is subtracted from the picture element data a1 in the subtracter 12. From the subtracter 12, a subtraction output of $$a1 - \tfrac{1}{2}(a0' + a1')$$

is obtained. The subtraction output is converted into an absolute value and supplied to the accumulator 14. The accumulator 14 accumulates a value of a subtraction output generated in the front area (½ block) Bij which contains picture element data a1. In the period of "1" of the control signal P2, an accumulation period is designated. An accumulated output is compared with a reference value. When the accumulated value is larger than the reference value, the decision code SJ is brought to "0" to provide the first mode where no frame dropping processing is done. Clearly, the encoded outputs of 32 picture element data a1, ..., p1, a1', ... p1' from the ADRC encoder 8 are selected at the switching circuit 9. One block delay occurs between the output side of the block segmentation circuit 2 and the output side of the latch 19 generating the decision code SJ. On the other hand, in the ADRC encoders 7 and 8, a delay of one block occurs for the detection of the maximum value MAX and the minimum value MIN. Consequently, the generation of the decision code SJ is in synchronism with that of the encoded outputs.

In contrast to the above-mentioned state, when the accumulated value is smaller than the reference value, the decision code SJ is brought to "1" so that the second mode to perform the frame dropping processing is set. Namely, the encoded outputs of 16 picture element data a1', . . . , p1' from ADRC encoder 7 are selected at the switching circuit 9. In this way, since the code signals DT for the sixteen picture elements of the area Bij' lying on the behind portion of one block are transmitted, the data amount of the transmitted code signals DT can be reduced to ½.

On the reception side (reproduction side), with respect to blocks which are not subjected to the frame dropping processing, reproduced values of 32 picture elements are provided by a three-dimensional ADRC decoder. Meanwhile, as to blocks subjected to the frame dropping processing, reproduced values of 16 pictures of the area Bij are obtained by a two-dimensional ADRC decoder. 16 picture elements in the area Bij which are not transmitted due to the frame dropping processing are interpolated by average values of the reproduced values at the same positions of the area Bij' of the same block and the reproduced values at the same positions of the area Bij' of the previous block in time. This interpolation is the same as the method done in the decision on whether the frame dropping is needed.

In the above-mentioned embodiment, one block is made up of the two areas Bij and Bij' respectively belonging to two frames, and in the frame dropping, only data of the subsequent area Bij' is transmitted. However, without being limited to the one embodiment, only data of an arbitrary area in n areas extending over n frames may be transmitted or data of m areas (m<n) may be transmitted.

Figure 8B:
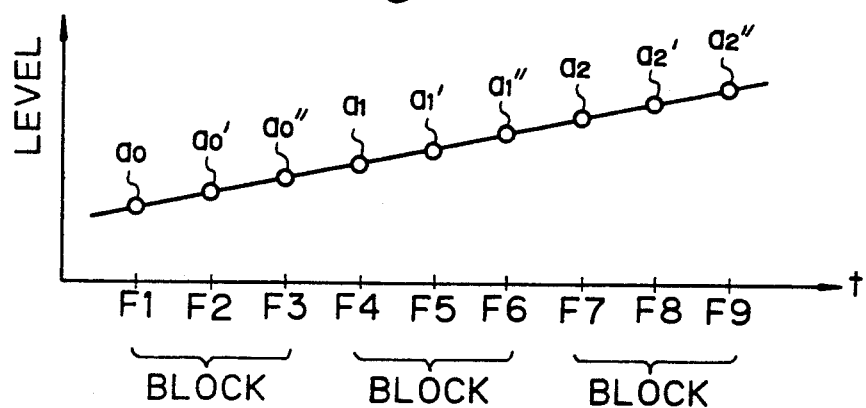

For instance, as shown in FIG. 8B, when one block is made up of three areas respectively belonging to consecutive three frames F1, F2 and F3 (similarly, F4, F5 and F6, F7, F8 and F9, . . . ), the frame dropping processing where only data (a0", a1", . . . ) of the last area of each block is sent may be performed. The decision on the frame dropping with respect to the blocks including data a1, a1', a1", etc., is done on the basis of a level difference between an interpolated value ⅓(2a0"+a1") obtained from values a0" and a1" and a1, and a level difference between an interpolated value ⅓(a0"+2a1") and a1'.

In addition, interpolation methods other than linear interpolation can be adopted in the invention. One of them is replacement of previous values in which data of the first area of one block is sent and non-transmission data of other areas of the same block is held at the same value as the transmitted data. Another example is an interpolation of secondary function.

Further, a variable length type ADRC may be used in this invention. Of course, in this invention, a highly efficient code other than ADRC may be employed. Still further, the application of this invention is not limited to the combined use of the highly efficient codes.

Another embodiment by using sub-sampling with the method of this invention will be described referring to the drawings.

In the another embodiment, a television screen is divided into a large number of areas, two areas belonging to two consecutive frames compose a three-dimensional block. An interpolation method is determined in a three-dimensional block unit and encoding is done for compressing the data amount.

A picture of one frame is segmented into (M×N) as shown in FIG. 3 to provide individual areas. The next frame in terms of time is similarly divided to provide individual areas. One area is, for example, (4 lines×8 elements), as a result, the number of picture elements of one block equal to 64.

FIG. 9 shows changes in terms of time with respect to the blocks present in the same positions in space. In Fig. 9, An is an area which belongs to the nth frame Fn and has a size of (4 lines×8 picture elements), and An+1 is an area which belongs to the (n+1)th frame Fn+1 and has a size of (4 lines×8 picture elements). These two areas An and An+1 are set at corresponding positions in two frames. An is, for example, B12 and An+1 is B12' in FIG. 3. In FIG. 9, solid lines indicate lines of the first field and broken lines indicate lines of the second field. One block is composed of above areas An and An+1.

In addition, FIG. 9 shows sub-sampling patterns, and picture elements indicated × are thinned out by sub-sampling. For the example shown in FIG. 9, the phase of sub-sampling is inverted every line and every two frames. Therefore, the patterns of the sampling lattice of two areas in the block are identical.

FIG. 10 shows a construction of a sub-sampling and block segmentation circuit 105 in the another embodiment. Reference numeral 111 is an input terminal for a digital video signal. The other of the input data is not block sequence but raster scanning sequence. The input data is supplied to delay circuits 112, 113 and 14 which are connected in series and to a delay circuit 115. Also, delay circuits 116, 117 and 118 are connected to a junction between the delay circuits 113 and 114. These delay circuits are provided for taking out an objective picture element which is a target for interpolation and adjacent plural data in terms of time and space simultaneously. The delay circuits 113, 114 and 115 indicated by SD have delay time equal to a sampling period of input data and the delay circuit 116 has delay time in correspondence to one horizontal period (1 H). On the other hand, the delay circuit 117 has delay time in correspondence to one frame time (FL)

With respect to peripheral plural picture elements of non-transmission picture element y included in the area An+1 of the (n+1)th frame Fn+1 of the above-described three-dimensional block, references are designated as shown in FIG. 9. A picture element d is a transmission picture element data included in the area of another block which is two lines under from the area An+1. The transmission picture element data a, b, c and d appear at an output side of the delay circuits 114, 112, 116 and 115 respectively at the timing when an objective non-transmission picture element y appears at an output side of the delay circuit 113 as shown in FIG. 10. A picture element data not shown in FIG. 9 is indicated by e, in FIG. 10 which is at the position corresponding to the objective picture element y of area An−1 in (n−1)th frame Fn−1 two frame, before appears at the output side of the delay circuit 117. A picture element data f, which is at the position corresponding to an objective picture element y of area An in frame Fn one frame before, appears at an output side of the delay circuit 118. This picture element data f is to be thinned out by sub-sampling. By using the data of peripheral picture elements of the objective picture element y, the plural kinds of interpolations which are similar to those provided on the reception side, for instance, four kinds of interpolations are performed at the same time. As a result, I1 to I4 are generated as interpolation outputs.

Interpolation output I1 is derived from a horizontal interpolation in a field and is generated by an adder 119.

$$I1 = \tfrac{1}{2}(a+b)$$

Interpolation output I2 is derived from a vertical interpolation of interframe and in generated by an adder 120.

$$I2 = \tfrac{1}{2}(c+d)$$

Interpolation output I3 is the data obtained by averaging four adjacent picture elements and is generated by an adder 121.

$$I3 = \tfrac{1}{4}(a+b+c+d)$$

The adders 119, 120 and 121 have a function which adds two data and divides the sum by two.

Interpolation output I4 is derived from an intraframe interpolation, and an interpolation is performed by using the picture element data e two frames before or the picture element data f one frame before e.

$$I4 = e \text{ or } f$$

The output data of the delay circuit 117 and the output of the delay circuit 118 are supplied to a switching circuit 112, and either one is selected by the switching circuit as the interpolation output I4. A control signal from a terminal 123 switches the switching circuit 122 every frame. There is the data of transmission picture element f one frame before in an area of a previous frame of the block, while there is the data of transmission picture element e two frames before in an area after the frame, since the sub-sampling is performed by the patterns as shown in FIG. 9. The switching circuit 122 selected these data of transmission picture elements. The data of transmission picture element e two frames before is selected by the switching circuit 122 when the above-mentioned non-transmission picture element data y is the objective picture element.

The above-mentioned interpolation outputs I1 to I4 are supplied to subtracters 124, 125, 126 and 127, respectively. These subtracters 124 to 127 receive the data of the objective picture element y and calculate errors between the real value of the objective picture element y and the interpolation outputs. The output signals of subtracters 124 to 127 are converted to one channel data, and the data is sent to an absolute value generator 128. An error data (8 bits×4=32 bits) from the absolute value generator 128 is supplied to one input terminal a of a sampling switch 129. The data of the objective picture element from the delay circuit 113 is supplied to the other input terminal b of the sampling switch 129.

The sampling switch 129 is controlled by a sampling pulse from the terminal 130. The sampling pulse has the phase which inverts the sub-sampling phase every line and every two frames. Accordingly, a real value of 8 bits of the picture element appears at every sampling point (indicated by 603 in FIG. 9) to be transmitted and 32 bits error data appears at every sampling point (interpolation points indicated by X in FIG. 9) to be thinned output at the output terminal c of the sampling switch 129.

The output signal of the sampling switch 129 is formed of time-division and multiplexed picture element data and error data. The data is sent to a block segmentation circuit 131, which is converted to the order of the three-dimensional block as mentioned above. The output signal of the block segmentation circuit 131 is fed to a distribution circuit 132. Data sequence Ds of picture element data and data sequence Es of error data are taken out separately from the distribution circuit 132. The sequence Ds of picture element data is sent to the frame dropping and ADRC encoder 106, and is subjected to the frame dropping and to the encoding processing of the ADRC aforementioned in detail referring FIG. 2.

The error data sequence Es from the distribution circuit 132 is supplied to a distribution circuit 133 which divides 32 bits parallel error data into four error data of 8 bits. The four error data are supplied to totalizing circuits 134, 135, 136 and 137, respectively. A reset pulse having a block period from a terminal 138 is supplied to these totalizing circuits 134 to 137. The error data with respect to 32 interpolation points in one block are totalized by the circuits 134 to 137. In this case, a consititution which converts error data to the sum of n-th power and totalizes the sum of n-th power may be used.

The output signals of totalizing circuits 134 to 137 are provided to a minimum value detector 139 which detects the minimum value among values gathered of error data and outputs an interpolation selection flag Fy. More specifically, 2 bits interpolation selection flag Fy for identifying the interpolation method in which the error is minimum is generated. For instance, the interpolation selection flag Fy of (00) is generated when the horizontal interpolation in a field is selected. The interpolation selection flag Fy of (01) is generated when the vertical interpolation in a frame is selected. The interpolation selection flag Fy of (10) is generated when the four points averaging interpolation is selected, and the interpolation selection flag Fy of (11) is generated when the intraframe interpolation is selected. The interpolation selection flag Fy is supplied to a frame segmentation circuit 7.

Which interpolation selection flag Fy is generated among the above depends on a picture content of the block. For example, (11) is generated as the interpolation selection flag Fy and the intraframe interpolation is done on the reception side in the case where the block is a still picture. The deterioration of the definition is prevented by the intraframe interpolation at a still portion.

In a reception side, although not shown, data processing is done in a reverse order of that of the transmission side. The reception data is subjected to the error correction and desegmented into an encoding output, a frame dropping flag SJ and a interpolation selection flag Fy by a frame desegmentatin circuit. The encoding output and the frame dropping flag SJ are supplied to an ADRC decoder, and transmission picture element data of sampling points are reproduced and the reproduced data are supplied to an interpolation circuit. The interpolation circuit, in respect with non-transmission picture elements thinned out by sub-sampling, is constructed so as to perform four kinds of interpolation selectively every block in response to the interpolation selection flag Fy.

FIG. 11 shows an example of construction of the frame dropping and the ADRC encoder 106. The output signal of distribution circuit 132 converted to the block order (data after sub-sampling processing) is supplied to an input terminal 141. The input data is supplied to a four-frame delay circuit 142, a ½ block delay circuit 143 and a multiplying circuit 144, and interpolation errors are detected thereby.

In this other embodiment, in the second mode where the frame dropping is done, the code signal DT of the area Bij'(An+1) subsequent in time of two areas which forms one block is transmitted, whereas the code signal DT of the front area Bij(An) is not sent. The two-dimensional ADRC encoder 7 encodes 16 picture element data compressed to ½ through the frame dropping. A three-dimensional ADRC encoder 8 encodes 32 picture element data in the first mode where no frame dropping is done. On the reception side, data included in an area in which the frame dropping is done are interpolated by linear interpolation using data of transmission picture element (primary order interpolation) with respect to the blocks subjected to the frame dropping. The decision on whether the frame dropping is done is made based on a magnitude of the difference between a real value and an interpolated value obtained by the same interpolation as the interpolation system of the reception side.

The multiplying circuit 144 multiplies the value of input signal from the four-frame delay circuit 142 by three and its multiplication output is supplied to an adder 149. The output signal from the four-frame delay circuit is supplied to the adder 149. The output signal from the adder 149 is supplied to a bit shift circuit 150 and divided by four thereby. An interpolation value is obtained at the output terminal of the bit shift circuit 150. The output signal from the bit shift circuit 150 is subtracted from the output signal of the ½ block delay circuit 143 by a subtracter 151 which provides an interpolation error signal. The remaining construction of FIG. 11 is just the same as that of FIG. 2 and the identical reference numerals are allotted to corresponding elements so that a detailed description is omitted.

Figure 12A:
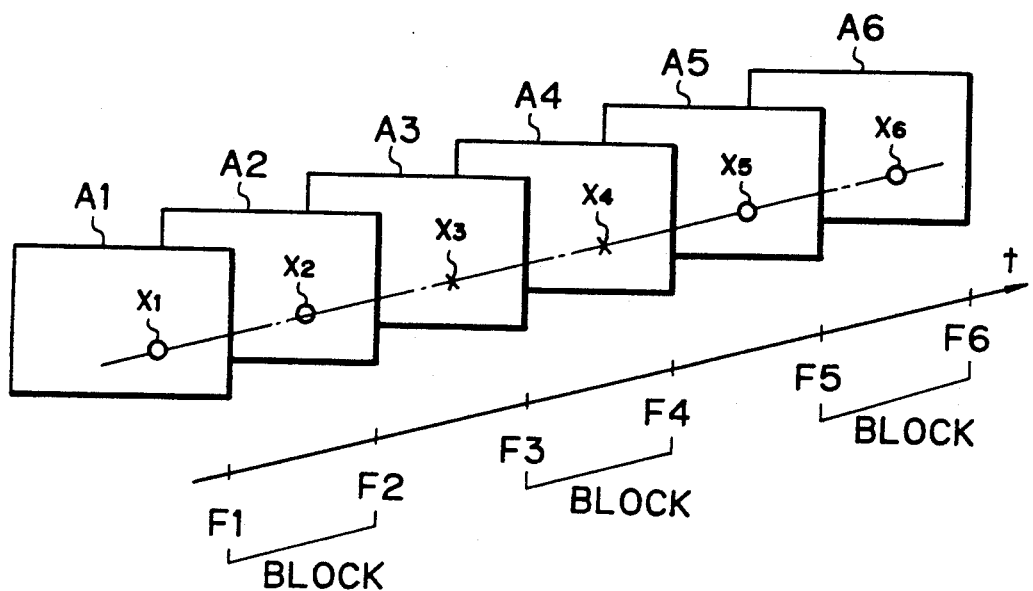
FIGS. 12A and 12B are schematic diagrams for explaining an operation of the ADRC encoder shown in FIG. 11.
Figure 12B:
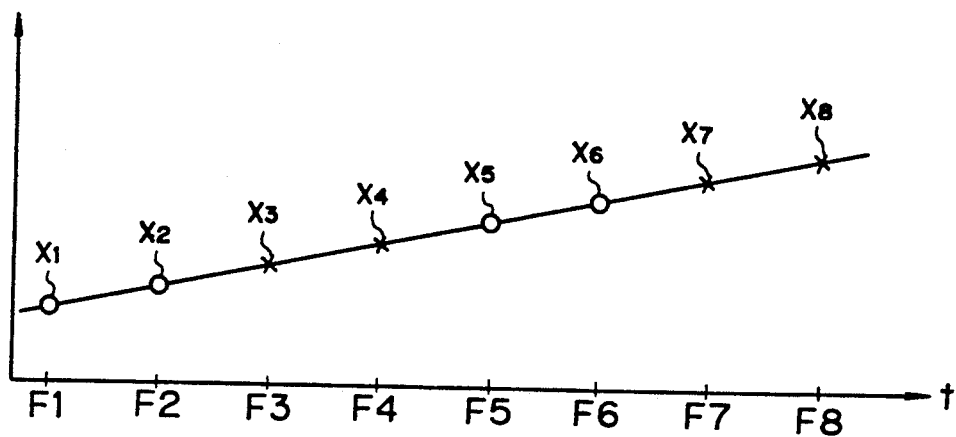

Now the frame dropping processing will be explained referring to FIG. 12. In FIG. 12, F1, F2, F3, . . . denote subsequent first frame, second frame, third frame . . . respectively. It is assumed that the picture element data (referred to FIG. 9) x1, x2, x3, . . . located at the same position in space of the three-dimensional block constructed by two areas An and An+1 are objective picture elements as shown in FIG. 12A. An example of the level change of this picture element data is shown in FIG. 12B.

An operation will be explained in the case where an objective block, which is a target for the frame dropping decision, is a block including the picture element data x5 and x6.

When the picture element data x6 is supplied from the input terminal 141, the picture element data x2 is output from the four-frame delay circuit 142. In addition, in the timing, the picture element data x5 is obtained at the output side of the ½ block delay circuit 143. As a result, an interpolation value ¼ (3x6+x2) is developed by the adder 149 and the bit shift circuit 150. The interpolation value is subtracted from the picture element data x5 in the subtracter 151. From the subtracter 151, a subtraction output of $$x5 - \tfrac{1}{4}(3x6+x2)$$

is obtained. This subtraction output is converted into an absolute value and supplied to an accumulator 14. The accumulator 14 accumulates absolute values of subtraction output generated in the area A5 which includes picture element data x5. In the duration within which the control signal P2 is "1", the accumulation is performed. The accumulated output is compared with a reference value. When the acumulated value is larger than the reference value, the frame dropping flag SJ is brought to "0" to provide the first mode where no frame dropping is done. Clearly, the encoded outputs of 32 picture element data from the ADRC encoder 8 are selected at switching circuit 9. One block delay occurs between the input data and the output side of a latch 19 generating the frame dropping flag SJ. On the other hand, in the ADRC encoders 7 and 8, one block delay occurs for the detection of the maximum value MAX and the minimum value MIN. Consequently, the generation of the frame dropping flag SJ is in synchronism with that of the encoded outputs.

In contrast to the above-described state, when the accumulated value is smaller than the reference value, the frame dropping flag SJ is brought to "1" so that the second mode to perform the frame dropping is set. Namely, data of 16 transmission picture elements of the area A6 passed through a gate circuit 6 are provided to the ADRC encoder 7. The encoded outputs of the ADRC encoder 7 are selected by the switching circuit 9. In this way, since the code signals DT for the 16 picture elements of the area An+1 lying one block behind are transmitted, the data amount of the transmitted code signals DT can be reduced to ½.

On the reception side (reproduction side), with respect to blocks which are not subjected to the frame dropping, reproduced values of 32 picture elements are provided by a three-dimensional ADRC decoder. Meanwhile, as to blocks subjected to the frame dropping, reproduced values of 16 picture elements of the area An+1 are obtained by a two-dimensional ADRC decoder. 16 picture elements in the area An which are not transmitted due to the frame dropping are interpolated by a linear interpolation of the reproduced values at the same positions of the area An+1 of the same block and the reproduced values at the same positions of the area A-3 of the previous block in time.

In the above-described one embodiment, a flag signal which indicates an interpolation method with respect to the thinned-out picture element by sub-sampling is generated based on the smallest totalized value of errors. However, the number of picture elements in which the error is beyond a threshold value is totalized, and the flag signal may be generated on the basis of the smallest value in totalizing. There is no need for sub-sampling with respect to the block in the case where the smallest value is beyond the threshold value. In this case, there is need for adding the flag signal with respect to sub-sampling.

In addition, in the above-mentioned embodiment, one block is made up from two area An and An+1 belonging to two frames respectively, and when the frame dropping is done only data of the subsequent area An+1 is transmitted. However, without being limited to the embodiment, only data of an arbitrary area in n areas extending over n frames (n≧2) may be transmitted or data of m areas (m<n) may be transmitted.

Further, interpolation methods other than the linear interpolation can be employed in the invention. One of them is replacement of previous values in which data of the first area of one block is sent and non-transmission data of other areas of the same block is held at the same value as the transmitted data. Another example is an interpolation of secondary function.

Still further, a variable length type ADRC may be used in this invention. Needless to say, in this invention, a highly efficient code like DCT (discrete cosine transform) other than ADRC may be employed. Moreover the compressing code is not indispensable.

The invention obtains an interpolated value by the same system as the interpolation of non-transmitted picture elements done on the reception side and decides based on the difference between the interpolated value and its real value on whether the frame dropping process is performed. As a result, even when one of two blocks adjacent to each other in space is subjected to the frame dropping and the other is not subjected to the frame dropping, a difference in luminance level between the two blocks becomes small in a reproduced picture. For this reason, the generation of block distortion can be prevented. In addition, as opposed to a simple still decision, the invention enables the frame dropping in portions where a level change occurs consecutively other than still portions so as to improve the compression efficiency of data.

Having described specific preferred embodiments of the present invention with reference to the accompanying drawings, it is to be understood that the invention is not limited to those precise embodiments, and that various changes and modifications may be effected therein by one skilled in the art without departing from the scope or the spirit of the invention as defined in the appended claims.

What is claimed is:

1. A highly efficient coding apparatus for coding digital video data in a format composed of blocks of digital video data representing a three-dimensional group of picture elements belonging to a plurality of fields and allowing compression of the video data,
    interpolating means for interpolating digital video data in one of said plurality of fields of one block from digital video data in another of said plurality of fields of said block and for generating interpolated digital video data,
    detecting means for detecting a difference between said interpolated digital video data and real digital video data,
    control signal generating means for generating a control signal for said block in response to the output of said detecting means,
    encoding means for encoding digital video data in said block belonging to all of said plurality of fields in a first mode and for encoding digital video data in said block belonging to the other of said plurality of fields in a second mode,
    selecting means for selecting one of said first and second modes in response to said control signal, and
    transmitting means for transmitting the output of said encoding means and said control signal for each said block.

2. A highly efficient coding apparatus according to claim 1, wherein said interpolating means interpolates digital video data from digital video data of said block and digital video data of a block spatially corresponding to said block and temporarily preceding or succeeding said block.

3. A highly efficient coding apparatus according to claim 1, wherein said control signal generating means includes means for accumulating the output of said detecting means for said block and comparator means for comparing the output of said accumulating means with a reference signal.

4. A highly efficient coding apparatus according to claim 1, further comprising sub-sampling means for sub-sampling picture elements in predetermined position in each of said blocks of digital video data to reduce the number of picture elements in each of said block to 1/n of the original number of the picture elements in each of said blocks,
    calculating means for calculating the difference between the thinned out data and interpolated data according to a plurality of interpolating methods using transmitted digital video data of picture elements spatially and temporally adjacent to the picture element corresponding to said thinned out data, and
    selecting means for selecting one of said plurality of interpolating methods in response to the output of said calculating means and for generating flag data for each block, said flag data being transmitted by said transmitting means.

* * * * *

UNITED STATES PATENT AND TRADEMARK OFFICE
CERTIFICATE OF CORRECTION

Figure 1:
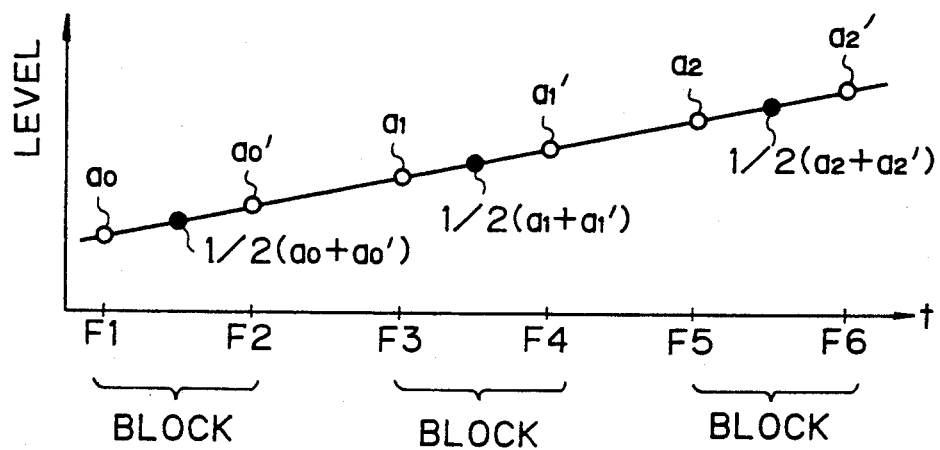
FIG. 1 is a schematic diagram for explaining an operation of a conventional frame dropping.

PATENT NO. : 5,068,726
DATED : November 26, 1991
INVENTOR(S) : Tetsujiro Kondo; Kenji Takahashi It is certified that error appears in the above-identified patent and that said Letters Patent is hereby corrected as shown below:

Col. 1, line 66, after "the" insert --two areas is developed. That is, in Fig. 1, average--

Col. 3, lines 20 and 21, change "of detail constitution showing in" to --showing in detail--

Col. 4, line 58, after "of" insert --the--

Col. 8, line 27, change "14" to --114--
      line 53, change "e, in Fig. 10" to --e in Fig. 10,--
      line 55, change "frame," to --frames before,--

Col. 9, line 60, change "603" to --O--

Col. 11, line 25, after "three" insert --,--

Col. 12, line 8, after "at" insert --the--
      line 55, change "area" to --areas--

UNITED STATES PATENT AND TRADEMARK OFFICE
CERTIFICATE OF CORRECTION

PATENT NO. : 5,068,726

DATED : November 26, 1991

INVENTOR(S) : Tetsujiro Kondo; Kenji Takahashi

It is certified that error appears in the above-identified patent and that said Letters Patent is hereby corrected as shown below:

In the Claims:

Col. 14, line 19, change "temporarily" to --temporally--
line 31, change "block" to --blocks--

Signed and Sealed this

Twentieth Day of April, 1993

Attest:

MICHAEL K. KIRK

Attesting Officer

Acting Commissioner of Patents and Trademarks